Figure 1:
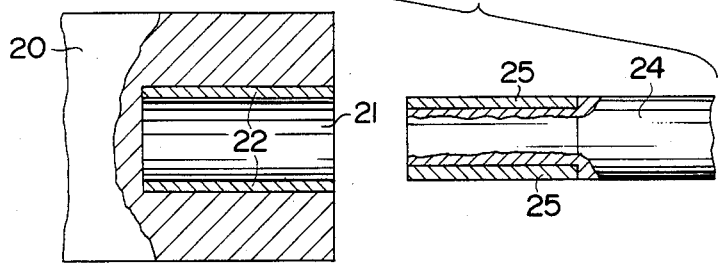

United States Patent [19]

Thoma et al.

[11] Patent Number: 4,600,479

[45] Date of Patent: Jul. 15, 1986

[54] METHOD FOR PROTECTING PAIRED METAL FORCE-TRANSMITTING MACHINE ELEMENTS AGAINST FRETTING CORROSION

[75] Inventors: Martin Thoma; Paul Bünger, both of Munich, Fed. Rep. of Germany

[73] Assignee: MTU Motoren- und Turbinen-Union Muenchen GmbH, Munich, Fed. Rep. of Germany

[21] Appl. No.: 533,298

[22] Filed: Sep. 19, 1983

[30] Foreign Application Priority Data

Oct. 1, 1982 [DE] Fed. Rep. of Germany ....... 3236376

[51] Int. Cl.[4] .............................................. C25D 3/38
[52] U.S. Cl. ................................ 204/14.1; 204/46 R; 204/52 R; 428/594; 428/660; 428/671; 428/591
[58] Field of Search .......................... 422/7; 384/294; 308/DIG. 5, DIG. 8, 241; 428/660, 655, 591, 594, 671; 204/141, 46 R, 52 R

[56] References Cited

U.S. PATENT DOCUMENTS

| | | | |
|---|---|---|---|
| 4,162,813 | 7/1979 | Mashburn et al. | 308/DIG. 5 |
| 4,188,079 | 2/1980 | Mori | 384/294 |
| 4,215,181 | 7/1980 | Betts . | |
| 4,233,487 | 11/1980 | Moriki et al. | 228/46 |
| 4,289,631 | 9/1981 | Luxemburg | 175/371 |
| 4,452,866 | 6/1984 | Kamiya et al. | 308/DIG. 8 |

FOREIGN PATENT DOCUMENTS 2430363  1/1975  Fed. Rep. of Germany .
8326     6/1979  Fed. Rep. of Germany .
2836334  5/1980  Fed. Rep. of Germany .

OTHER PUBLICATIONS

"Ueber den Einfluss der Oberflaeche auf die Entstchung von Reibkorrosion" von W. Funk, Darmstadt, pp. 362 to 367, Metalloberflaeche 22 Jg. 1968 Heft 12.
"Forschungshefte Forschungskuratorium Maschinenbau e.v.", Heft 56, 1976, Reibkorrosion-Abschlussbericht, pp. 1, 131-139.

Primary Examiner—David L. Lacey
Assistant Examiner—Titus B. Ledbetter, Jr.
Attorney, Agent, or Firm—W. G. Fasse; D. H. Kane, Jr.

[57] ABSTRACT

Paired metal force-transmitting machine elements are protected against fretting corrosion under dynamic or oscillating load or stress conditions by a protection layer between pairing surfaces, whereby a direct contact between these pairing or junction surfaces is avoided. The protection layer is a material having a different composition than that of the machine elements. The protection layer is applied between the paired surfaces and to at least one of the paired surfaces. The protection layer has a different crystal structure and a lower hardness than titanium material of which the machine elements are made. The protection layer is galvanically applied and is advantageously of copper, aluminum or silver, whereby the thickness is 5–50 μm. In this way the fretting fatigue durability of machine elements made completely or partially of titanium materials is greatly improved in a simple manner.

6 Claims, 2 Drawing Figures

METHOD FOR PROTECTING PAIRED METAL FORCE-TRANSMITTING MACHINE ELEMENTS AGAINST FRETTING CORROSION

BACKGROUND OF THE INVENTION

The invention relates to a method for protecting force transmitting machine elements forming pairs, which are subject to oscillating loads, against fretting corrosion. Especially machine elements having the same composition or characteristics are subject to such fretting corrosion.

In force-transmitting machine elements forming pairs, for instance in power plants or drive trains made of titanium, especially in the area of the blade bases or blade feet, fatigue failures occasionally occur already at loads far under the fatigue strength limit. Such fatigue failures start at surface areas subject to fretting corrosion damages. The cause of such damages is a complex surface loading or stress which is called "fretting fatigue stress or load".

This fretting fatigue stress is composed of a surface pressure or compression and an alternating shear stress or strain due to smallest chafing motions, also referred to as "slip" between the paired or pairing surfaces. The arising shear strains are unexpectedly high. The fretting fatigue load or stress can damage the machine element in two ways. On the one hand, fretting corrosion can arise as surface damage. On the other hand, a reduction of the fatigue strength limit results in machine elements subject to oscillating or dynamic loads if two metals rub against each other. The movement is cyclically oscillating with a movement direction in parallel to the junction surface forming said pairing surface. The oscillating amplitude is so small that surface damage by abrasion results, but no abraded matter or particles can be removed from the contact or pairing surfaces.

The fretting corrosion damage allows making inferences or conclusions regarding the fretting fatigue load or stress. If the fretting fatigue stress exceeds the strength limit of the material, microcracks result in the surface. As a result, tribologically, chemically activated particles may be emitted from the surface, which particles spontaneously react with the oxygen of the atmospheric air or with oxygen used as a working medium. The thus arising oxidic products of abrasion led to the term "fretting corrosion".

The following observations may be made about the extent of the surface destruction:

the boundary surface forming one of the pairing surfaces is subject to erosion or wear and tear which increases with the number of fretting or frictional oscillations, the boundary surface erosion or wear and tear increases with increasing surface pressure, the initial condition of the boundary surface practically does not influence the extent of the destruction, and lubricants have only a slight effect or influence on the reduction of fretting corrosion damages.

If a machine element subject to oscillating or dynamic loads is additionally subjected to a fretting fatigue load on the surface, then a reduction of the fatigue durability or strength results. In practice, the term "fretting fatigue fracture" is used for the fracture of an oscillatingly loaded structural element. Such fracture originates from said fretting fatigue loaded surface. The fretting fatigue fracture is reliably distinguished from other fatigue fractures by oxidic abrasion products and by a so-called "nose" at the starting point of the fracture.

The largest oscillating load or dynamic stress applied to a structural machine element which does not cause any fretting fatigue fracture is termed "fretting fatigue durability or strength".

The danger of fretting fatigue fractures in oscillatingly or dynamically loaded machine elements or structural groups of such elements always exists if these elements are so arranged that oscillating relative displacements (or "slip") occur between the paired surfaces under load conditions. Thus, fretting fatigue fractures occur quite frequently, among other situations in sealing inserts for rotors of turbo-compressors, and especially in power plants equipped with titanium blades where these fractures occur in the area of the blade bases.

For avoiding such fractures, various steps have already been recommended (Forschungshefte-Forschungskuratorium Maschinenbau e.V. Heft 56, 1976, pages 131 to 139 "Reibkorrosion-Abschlussbericht"). Such steps include, for instance, avoiding force transmitting paired junction surfaces, e.g. by welding, soldering or by adhesive connections rather than contraction or clamping connections; reduction of the fretting fatigue load or stress by various measures, e.g. by making the strain or tension differences of the paired elements as small as possible, or by separating the fretting fatigue load from the structural component load by means of relief notches on the connecting elements, whicn connect the junction parts. For example, axial and tangential relief notches may be provided in fitted bolts for disk clutches.

It is also known from German Patent Application No. DE-AS 2,836,334 to provide the junction surfaces of the machine parts with connection elements having a different crystal structure and a larger hardness than the parts to be joined, in order to increase the fretting fatigue durability or rather decreasing the fretting corrosion of the junction parts. These connection elements are however, discrete structural components and are comparatively massive and hence their usability is only limited. Such connection elements are unsuitable for power plants with titanium blades for avoiding or reducing the fretting corrosion, especially at the blade bases, due to the reduced fretting fatigue durability of the material under oscillating fretting loads or dynamic fretting stress.

OBJECTS OF THE INVENTION

In view of the above it is the aim of the invention to achieve the following objects singly or in combination:

to avoid a direct contact between two paired or junction surfaces of two machine elements to be interconnected in a force transmitting manner for minimizing fretting corrosion;

to place a protection layer on at least one of the pairing surfaces for minimizing fretting corrosion;

to provide a method of the initially mentioned type, by which the working life of paired force-transmitting machine components made partially or completely of titanium materials may be essentially lengthened, whereby the fretting corrosion on these parts is substantially reduced; and to apply the protection layer or layers galvanically.

SUMMARY OF THE INVENTION

The present method is characterized in that a metal material protection layer is applied to a surface of at least one machine element made partially or entirely of titanium, which layer has a different crystal structure and a lower hardness than the titanium material. The protection layer is applied by a galvanic deposition to a critical thickness of about 5 to 50 micron, for an efficient prevention or at least substantial reduction of the fretting corrosion.

It is especially advantageous when the material layer is made of copper, aluminum or silver.

BRIEF FIGURE DESCRIPTION

Figure 2:
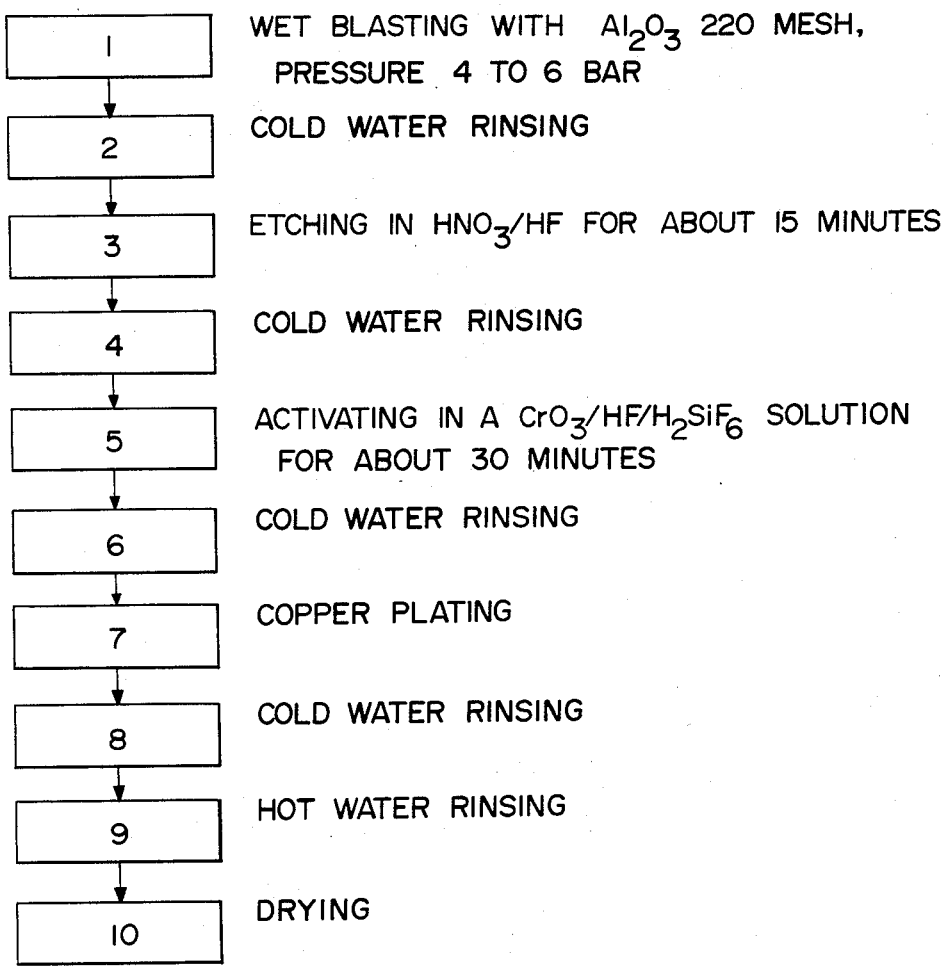

In order that the invention may be clearly understood, it will now be described, by way of example, with reference to the accompanying drawings, wherein:

FIG. 1 is a sectional view through two machine elements dimensioned for a force transmitting coupling from one element to the other; and FIG. 2 is a flow diagram of the steps performed in copper plating the one or both coupling or pairing surfaces.

DETAILED DESCRIPTION OF PREFERRED EXAMPLE EMBODIMENTS AND OF THE BEST MODE OF THE INVENTION

FIG. 1 shows a first machine element such as a coupling socket 20 having a recess 21 with a protection layer 22 and a second machine element 24 such as a shaft having a protection layer 25. The layers 22 and 25 are deposited galvanically or chemically as will be described in more detail below.

The layers 22 and 25 have preferably a thickness of 5 to 50 micrometers for an effective limitation of fretting corrosion when the element 24 is fitted into the socket 20 with such a fit that force may be transmitted through the coupling under dynamic load conditions.

In connection with machine elements made of a titanium material known as $TiAl_6V_4$ according to German industrial standards, having a fatigue dynamic strength of 500 $N/mm^2$ and a fretting fatigue durability of 200 $N/mm^2$ the following improvements have been achieved by using Al, Ag and Cu respectively as the protection layer:

Fretting fatigue durability with Al—300 $N/mm^2$;
Fretting fatigue durability with Ag—300 $N/mm^2$;
Fretting fatigue durability with Cu—500 $N/mm^2$.

FIG. 2 shows the self-explanatory steps to be performed for a copper plating operation with the aid of a galvanic bath or a chemical deposition bath. These steps are numbered 1 to 10.

The following examples are provided for different types of plating operations.

EXAMPLE 1

(Galvanic Deposition)

Acidic Copper Bath
$CuSO_4.H_2O$: 275 grams/liter
$H_2SO_4$ (Density 1.84): 50 to 60 grams/liter
Temperature: 20° to 40° C.
Current Density: 3 to 5 Amps/$dm^2$

EXAMPLE 2

(Galvanic Deposition)

Cyanogenic Copper Bath
CuCN: 85 grams/liter
KCN: 150 grams/liter
KOH: 25 grams/liter
$K_2CO_3$: 5 grams/liter
Temperature: 35° to 50° C.
Current Density: 1 to 3 Amps/$dm^2$

EXAMPLE 3

(Chemical Deposition)

Chemical Copper Solution
$CuSO_4.5\ H_2O$: 10.5 grams/liter
HCHO (37% solution): 3.5 milliliter/liter reduction agent
NaCN: 26.0 milligram/liter ductility enhancer
EDTA: 17.5 grams/liter complexing agent
Temperature: 53°±1° C.
pH: 12.6

Similar procedures known to those skilled in the art may be used for aluminum or silver depositions.

Although the invention has been described with reference to specific example embodiments, it will be appreciated that it is intended to cover all modifications and equivalents within the scope of the appended claims.

What is claimed is:

1. A method of protecting metal machine elements for being paired in a force transmitting force-locking manner and for being subjected to oscillating load conditions, against fretting corrosion, comprising the following steps:

(a) providing metal machine elements each having a pairing surface made of a composition comprising titanium and having a given crystal structure and a given hardness, said pairing surfaces being provided for forming a pair of machine elements cooperating with each other in said force transmitting, force-locking manner, (b) galvanically depositing on at least one of said two pairing surfaces of the machine elements a protection layer made of a metal having a crystal structure which differs from the crystal structure of the composition comprising titanium, said metal of said protection layer having a smaller hardness than said given hardness of said composition comprising titanium, for preventing a direct contact between the machine elements when they are pairing, and (c) continuing said galvanically depositing step until said protection layer has a thickness within the range of about 5 to about 50 micrometer.

2. The method of claim 1, wherein said metal machine elements are made entirely of the composition comprising titanium.

3. The method of claim 1, wherein said metal machine elements are made partially of the composition comprising titanium.

4. The method of claim 1, wherein said metal is copper and said galvanically depositing is done in a galvanic copper bath.

5. The method of claim 1, wherein said metal is aluminum and said galvanically depositing is done in a galvanic aluminum bath.

6. The method of claim 1, wherein said metal is silver and said galvanically depositing is done in a galvanic silver bath.

* * * * *